United States Patent
You et al.

(10) Patent No.: US 7,039,000 B2
(45) Date of Patent: May 2, 2006

(54) TIMING SYNCHRONIZATION FOR OFDM-BASED WIRELESS NETWORKS

(75) Inventors: Charles You, Leonia, NJ (US); Henry Horng, Warren, NJ (US); Jin-Yun Zhang, New Providence, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1007 days.

(21) Appl. No.: 10/011,381

(22) Filed: Nov. 16, 2001

(65) Prior Publication Data

US 2003/0112743 A1 Jun. 19, 2003

(51) Int. Cl.
*H04J 11/00* (2006.01)

(52) U.S. Cl. .................... 370/203; 370/503

(58) Field of Classification Search ............... 370/203, 370/208, 210, 503, 509
See application file for complete search history.

(56) References Cited

U.S. PATENT DOCUMENTS

| | | | | |
|---|---|---|---|---|
| 6,125,124 A | | 9/2000 | Junell et al. ............... 370/503 |
| 6,137,847 A | * | 10/2000 | Stott et al. .................. 375/344 |
| 6,237,013 B1 | | 5/2001 | Usui ........................ 708/422 |
| 6,618,452 B1 | * | 9/2003 | Huber et al. ................ 375/343 |
| 6,628,697 B1 | * | 9/2003 | Douglas et al. ............. 375/139 |
| 6,700,866 B1 | * | 3/2004 | Heinonen et al. ........... 370/208 |
| 6,754,170 B1 | * | 6/2004 | Ward ......................... 370/208 |

FOREIGN PATENT DOCUMENTS

EP 1087582 * 3/2001

OTHER PUBLICATIONS

Fernando and Rajatheva, "*Performance of Trellis Coded OFDM for Fading Channels*," electronic Journal of the School of Advanced Technologies, Asian Institute of Technology, Thailand, p. 1-18.

* cited by examiner

Primary Examiner—Min Jung
(74) Attorney, Agent, or Firm—Dirk Brinkman; Andrew J. Curtin (57) ABSTRACT

Timing in a receiver is synchronized to an orthogonal frequency division multiplex (OFDM) signal transmitted over a channel. The OFDM signal includes multiple training symbols, including long and short training symbols. The first half of the training symbols are correlated with the second half to determine a coarse index which is used to adjust the unsynchronized OFDM. In the coursely adjusted OFDM signal, the first training symbol is then correlated with the last traininig symbol to determine a fine index to adjust the coarsely adjusted OFDM signal so that the receiver is synchronized with the transmitted OFDM signal.

10 Claims, 6 Drawing Sheets

TIMING SYNCHRONIZATION FOR OFDM-BASED WIRELESS NETWORKS

FIELD OF THE INVENTION

The invention relates generally to timing synchronization of communicated signals, and more particularly to detecting and correlating training symbols in OFDM wireless networks.

BACKGROUND OF THE INVENTION

Orthogonal frequency division multiplexing (OFDM) is a signal modulation technique in which a transmitter divides a signal, and then transmits the divided signal over several subcarriers. The subcarriers are located on a frequency axis of a base band frequency at regular intervals. In OFDM communications, in contrast with conventional serial communication techniques, the signal to be transmitted is divided into N streams, and the N stream are then transmitted in parallel, each on a separate carrier frequency. OFDM techniques transmit the signal reliably and efficiently at a high data rate.

The subcarriers are made "orthogonal" by appropriately selecting the spacing of the frequencies in the base frequency band. Therefore, spectral overlapping among subcarriers is allowed because the orthogonality ensures that the receiver can separate the OFDM subcarriers. With OFDM, a better spectral efficiency is achieved than by using simple frequency division multiplex. OFDM is more robust to data loss due to multipath fading when compared with a single carrier because OFDM increases the symbol period for the same aggregate data rate.

In addition, inter-symbol interference (ISI) in OFDM transmissions can be prevented by inserting a guard interval before each transmitted block. Moreover, OFDM is robust to frequency selective fading. Thus, OFDM is used by many standards, including digital audio and video broadcasting (DAB, DVB), and high-speed digital subscriber line (DSL) modems over a twisted pair of wires. OFDM can also be used in wireless local area networks (WLANS), and fixed broadband wireless communication networks.

However, with OFDM, timing and frequency synchronization is difficult. It is a problem to exactly synchronize symbols between the transmitter and the receiver. Timing synchronization requires that the beginning of each OFDM symbol is determined within each frame. Unless the correct timing is known, the receiver cannot remove cyclic prefixes at the correct timing instance, and correctly separate individual symbols before fast Fourier transforms (FFT) are performed to demodulate the signal.

In the prior art, a number of solutions are known for timing synchronization. One technique achieves synchronization by using a number of pilot symbols in specific subcarriers. However, the performance of that synchronization depends on the number of pilot subcarriers, thus the throughput is reduced, see, W. Warner and C. Leung, "OFDM/FM Frame Synchronization for Mobile Radio Data Communication," IEEE Trans. Veh. Technol., vol. 42, pp. 302–313, August 1993.

Another technique uses a joint method for finding the correct symbol timing and correcting the carrier frequency offset by using a correlation with a cyclic prefix. However, the guard interval may easily be corrupted by ISI due to multipath in a mobile channel. That technique also requires a long time to synchronize because it averages the correlated outputs of many OFDM symbols until satisfactory synchronization is achieved, see J. van de Beek, M. Sandell, P. O. Börjesson, "ML estimation of time and frequency offset in OFDM systems," IEEE Trans. Signal Processing, vol. 45, pp. 1800–1805, July 1997.

In yet another technique, two OFDM training symbols are used for timing and frequency synchronization. There, each training symbol includes two parts in the time domain, i.e., the two parts of each training symbol are made identical in time order by transmitting a pseudo-noise (PN) sequence on even frequencies, while zeros are used on odd frequencies. However, that method is not suitable for OFDM-based WLAN standards such as IEEE 802.11, because that standard defines a different training sequence, see T. M. Schmidl and D. C. Cox, "Robust frequency and timing synchronization for OFDM," IEEE Trans. Commun., vol. 45, pp. 1613–1621, December 1997.

Therefore, there is a need for synchronizing an OFDM signal in a wireless local area network in a manner that is compatible with existing standards.

SUMMARY OF THE INVENTION

The method of the present invention synchronizes the timing of OFDM signals. As an advantage, the method can be applied to standard OFDM-wireless local area networks (WLAN), and more generally to any OFDM system with a repeating OFDM training symbol structure. An OFDM-based WLAN uses multiple short training symbols. If consecutive short training symbols are correlated, then a flat plateau near a correct timing instance can be observed in the output. However, an exact timing instance is not clear because the plateau does not fall off sharply, and the plateau may include several peaks.

Therefore, the method according to the invention correlates the beginning and end portions in a training symbol sequence. After the portions are correlated, a distinct peak can be detected to adjust the timing correctly.

More particularly, timing in a receiver is synchronized to an orthogonal frequency division multiplex (OFDM) signal transmitted over a channel. The OFDM signal includes multiple training symbols, including long and short training symbols.

The first half of the training symbols are correlated with the second half to determine a coarse index which is used to adjust the unsynchronized OFDM.

Then, in the coursely adjusted OFDM signal, the first training symbol is correlated with the last traininig symbol to determine a fine index to adjust the coarsely adjusted OFDM signal so that the receiver is synchronized with the transmitted OFDM signal.

DETAILED DESCRIPTION OF THE PREFERRED EMBODIMENT

OFDM System Model

Figure 1:
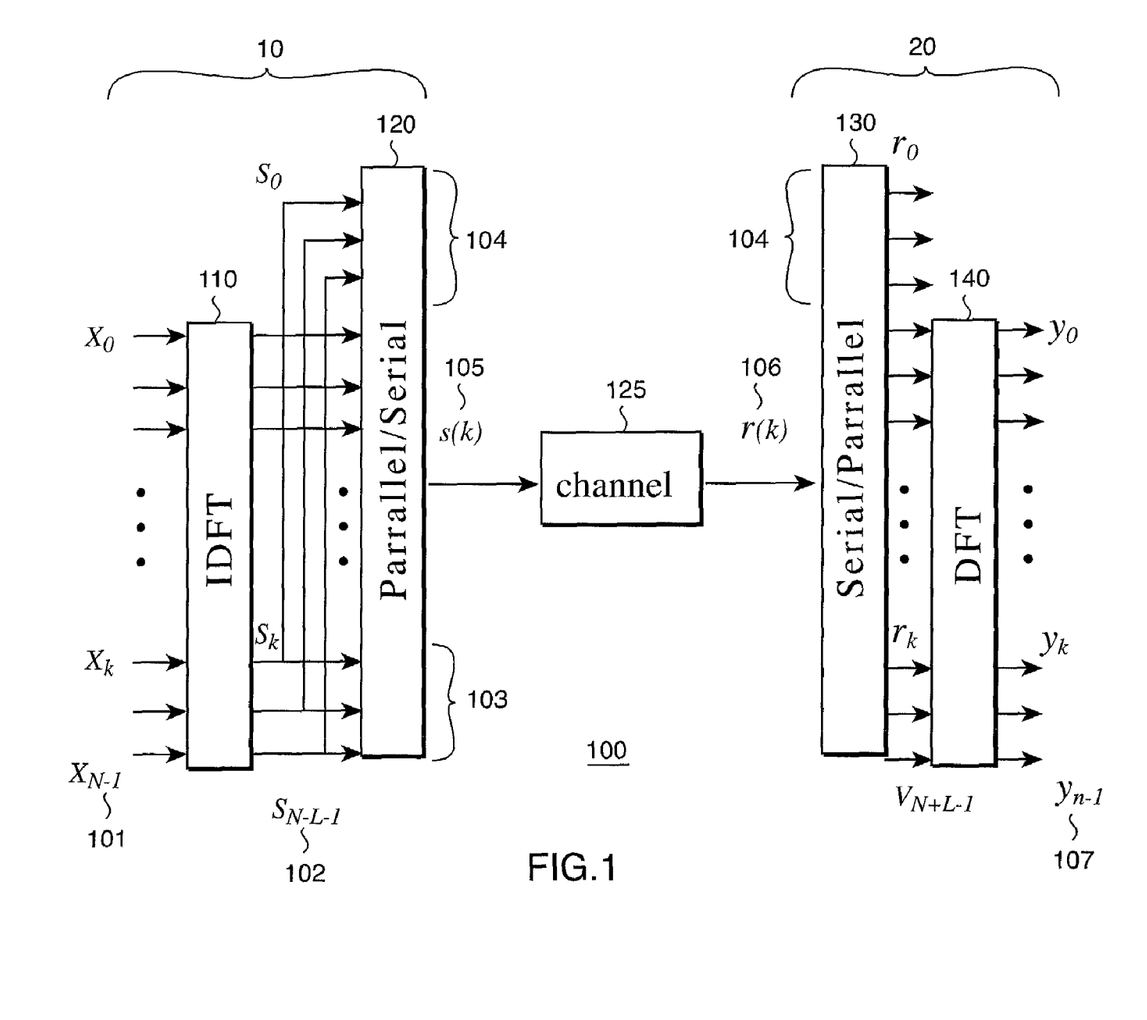
FIG. 1 is a block diagram of an OFDM system that uses the invention.

FIG. 1 shows a baseband, discrete-time OFDM system 100 that can use the invention. A transmitter 10 modulates input symbols $x_k$ 101, taken from signal constellation such as PSK, QAM, on N subcarrier frequencies $S_N$ 102 by an inverse discrete Fourier transform (IDFT) 110. The last L symbols 103 are copied and put as a guard interval or cyclic prefix 104 to form OFDM symbol $S_k$ 105. The insertion of the cyclic prefix 104 avoids ISI, and preserves the orthogonality between the frequencies of the subcarriers. After parallel to serial conversion 120, the OFDM symbols are transmitted over a discrete-time channel 125. The impulse response of the channel 120 is typically shorter than L samples.

In a receiver 20, signal data $r_k$ 106 are received, and the cyclic prefix 104 is removed. After serial to parallel conversion 130 with a discrete Fourier transform (DFT) 140, the signal is demodulated to received symbols $y_k$ 107. This results in a simple input-output relation:

$$y_k = h_k x_k + n_k, k=0, \ldots, N-1,$$

where $h_k$ is the channel attenuation at the $k^{th}$ subcarrier, and $n_k$ is noise. It is assumed that the channel 125 is non-dispersive and that the transmitted signal s(k) 105 is only affected by complex, additive, white Gaussian noise (AWGN) n(k), i.e., $h_k = \forall k \in \{0, \ldots, N-1\}$. The unknown arrival time of the OFDM symbols can be modeled as a delay in the channel impulse response, $\delta(k-d)$, where d is the unknown arrival time of a symbol in number of samples.

The offset in carrier frequency, which is due to mismatch between the oscillators in the transmitter 10 and the receiver 20, causes a shift in the frequency domain. This offset in carrier frequency can be modeled as a complex multiplicative distortion, in the time domain $e^{j2\pi\epsilon k/N}$, of the received data signal 106, where $\epsilon$ denotes a difference in the transmitter and receiver oscillators as a fraction of the inter-carrier spacing. Hence, the received data 106 are $$r(k) = s(k-d)e^{j2\pi\epsilon k/N} + n(k).$$

The transmitted OFDM baseband signal sequence is then given by an N point complex modulation sequence $$x_n = \left(\frac{1}{N}\right) \sum_{k=-K}^{K} X_k e^{j2\pi\epsilon k/N}, n=0, \ldots, N-1; N \geq 2K+1. \quad (1)$$

This sequence includes 2K+1 complex sinusoids modulated with 2K+1 modulation values $\{X_k\}$. At the receiver 20, the N-point sequence is demodulated by using the discrete Fourier transform (DFT)

$$DFT_N\{x_n\} = \left\{\sum_{n=0}^{N-1} x_n e^{-2\pi jnk/N}\right\}_{k=K,-K+1,\ldots,1,\ldots,K-1,K}, \quad (2)$$

to recover the input sequence $\{X_0, X_1, \ldots, X_K, 0,0, \ldots 0, X_{-K}, \ldots, X_{-2}, X_{-1}\}$ 101.

Structure of OFDM-based WLAN Training Symbols

A standard for an OFDM-based WLAN system is specified in *"Wireless LAN Medium Access Control (MAC) and Physical Layer (PHY) specifications: High-speed physical layer for the 5 GHz band,"* IEEE std 802.11a, pp. 3–24, September 1999. The parts relevant to the present invention as described below.

Figure 2:
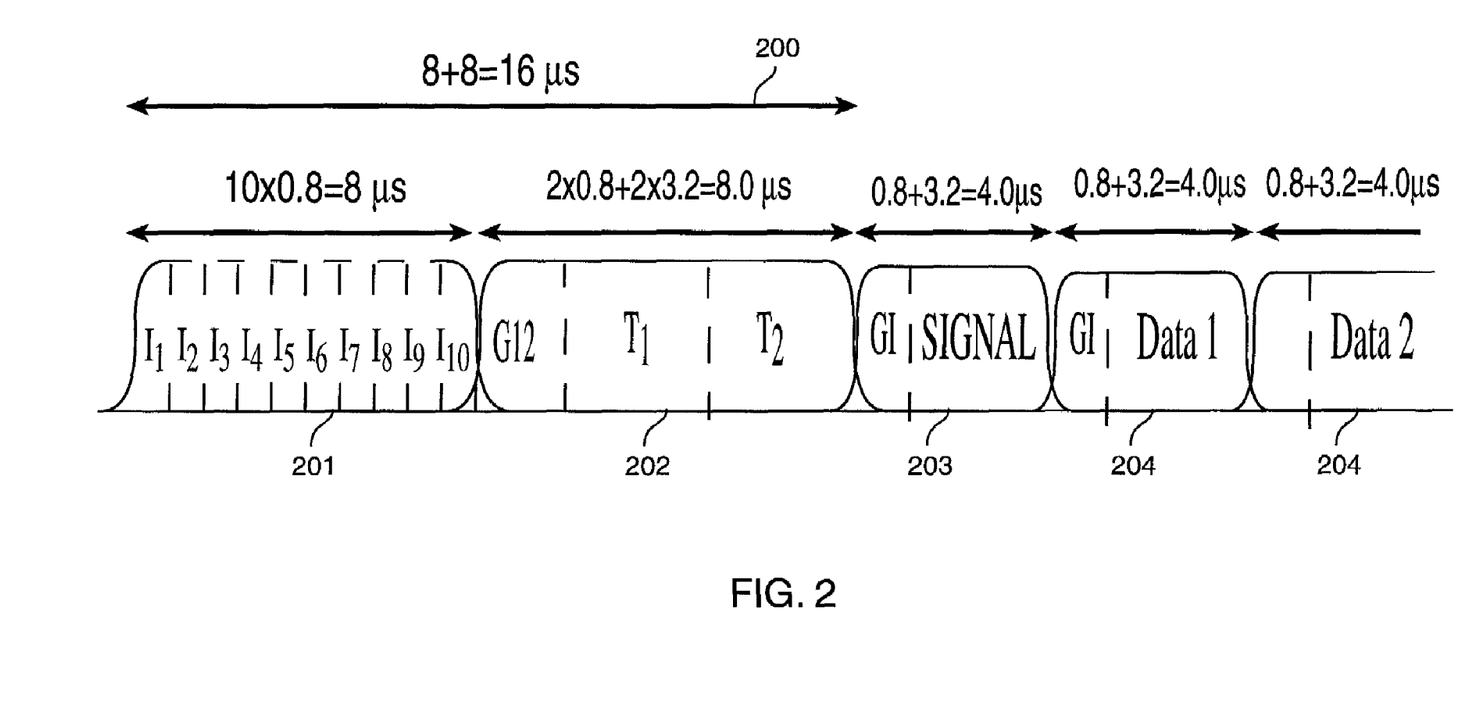
FIG. 2 is a timing diagram of an OFDM signal used by the invention.

As shown in FIG. 2, a physical layer convergence procedure (PLCP) preamble field 200 is used for synchronization. The preamble field 200 includes a field of ten short training symbols 201 and a field of two long training symbols 202. The PLCP preamble field 200 is followed by a signal field 203 and multiple data fields 204. The total length of the preamble field 200 is 16 µs. The vertical dashed boundaries in FIG. 2 denote repetitions due to the periodicity of the IDFT 140.

A short OFDM training symbol is multiplexed over twelve subcarriers, which are modulated by the elements of a sequence S:

$$S_{-26, 26} = \sqrt{(13/6)} \times \{0, 0, 1+j, 0, 0, 0, -1-j, 0, 0, 0, \\
1+j, 0, 0, 0, -1-j, 0, 0, 0, -1-j, 0, 0, 0, 1+j, 0, \\
0, 0, 0, 0, 0, -1-j, 0, 0, 0, -1-j, 0, 0, 0, 1+j, \\
0, 0, 0, 1+j, 0, 0, 0, 1+j, 0, 0, 0, 1+j, 0, 0\}. \quad (3)$$

The multiplication by the factor $\sqrt{(13/6)}$ normalizes the average power of the resulting OFDM symbol. The short training symbol is generated according to:

$$r_{SHORT}^{(t)} = w_{SHORT}^{(t)} \sum_{k=-N_{ST}/2}^{N_{ST}/2} S_K \exp(j2\pi\Delta_F t).$$

The fact that only spectral lines of S–26, 26 with indices that are a multiple of four have non-zero amplitudes results in a periodicity of TFFT/4=0.8 µs. The interval $T_{SHORT}$ is equal to ten 0.8 µs periods, i.e., a total of 8 µs.

A long OFDM training symbol is multiplexed over fifty-three subcarriers, including a zero value at DC, which are modulated elements of a sequence L:

$$L_{-26, 26} = \{1, 1, -1, -1, 1, 1, -1, 1, -1, 1, 1, 1, 1, 1, \\
1, -1, -1, 1, 1, -1, 1, -1, 1, 1, 1, 1, 0, 1, -1, \\
-1, 1, 1, -1, 1, -1, 1, -1, -1, -1, -1, -1, 1, 1, \\
-1, -1, 1, -1, 1, -1, 1, 1. \quad (4)$$

The long OFDM training symbol is generated according to:

$$r_{LONG}^{(t)} = w_{LONG}^{(t)} \sum_{k=-N_{ST}/2}^{N_{ST}/2} L_K \exp(j2\pi\Delta_F T_{G12}),$$

where $T_{G12}$=1.6 µs.

Two periods of the long sequence are transmitted for improved channel estimation accuracy, yielding a time interval $$T_{LONG} = 1.6 + 2 \times 3.2 = 8 \text{ µs}.$$

The short training symbols and long training symbols are concatenated to form the preamble field 200:

$$r_{PREAMBLE}(t) = r_{SHORT}(t) + r_{LONG}(t-T_{SHORT}).$$

Timing Synchronization

Although the synchronization method according to the invention is described with reference to the OFDM-based wireless local area network standard, it should be understood that the method can also be applied to any preamble structure with repeated training symbols.

To estimate symbol timing so that the receiver 20 can be synchronized, the method according to the invention first detects the presence of the transmitted OFDM signal, and then estimates the beginning of the preamble field 200.

Figure 6:
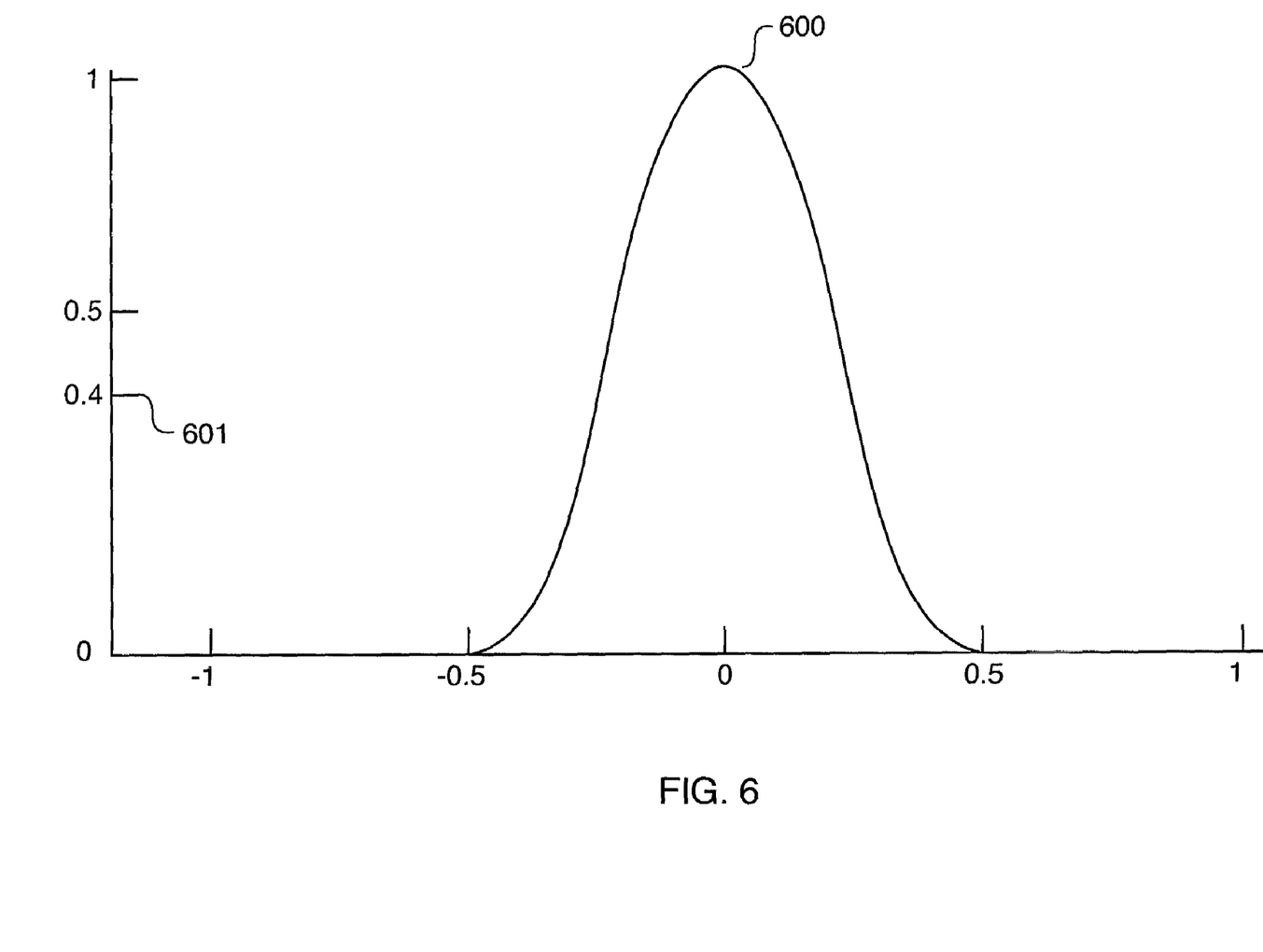
FIG. 6 is a timing diagram of correlated training symbols.

The method according to the invention also exploits time-domain symmetry properties of the beginning and end of the training symbols to estimate the correct symbol timing more accurately by a correlation process. Specifically, due to the identical time-domain symmetry of the short training symbols, the normalized correlated output is larger at the correct timing than at an incorrect timing. Thus, the correlated output forms a peak 600 at the correct timing, see FIG. 6. FIG. 6 shows the normalized correlated output as a function of symbol time. As described below, peak detection is invoked when the correlated output exceed a threshold value 601.

OFDM Signal Detection and Synchronization Method

Figure 3:
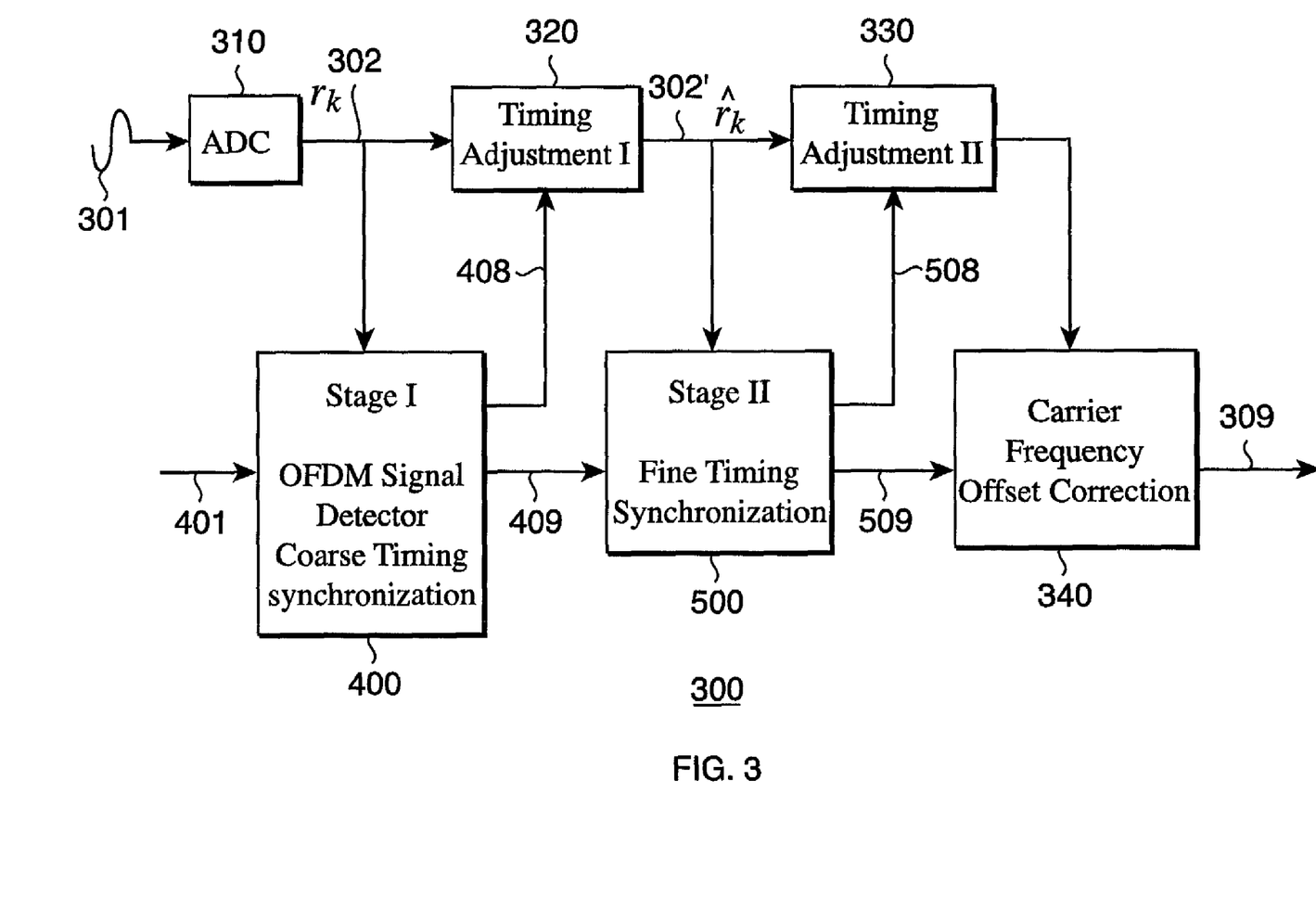
FIG. 3 is a flow diagram of an OFDM synchronization method according to the invention.

FIG. 3 shows a timing synchronization method 300 according to the invention. The input to the method 300 is a received analog OFDM signal 301. After analog-to-digital conversion 310, the synchronization method proceeds in two stages, a coarse stage I 400, and a fine stage II 500. After each stage, the receiver's timing is adjusted (coarse in step 320 and fine in step 330). After timing synchronization, frequency synchronization 340 can be performed so that demodulation of the synchronized signal 309 can begin.

In greater detail, the received OFDM signal 301 is first passed through an A/D converter 310. The ADC produces, for example, digital samples at 20 MHz, i.e., sixteen samples for each short training symbol. The digital signal $r_k$ 302 is passed to an OFDM signal detector 400 initiated by a start stage I signal 401. The output of stage I 400 is a coarse index signal 408 which is used to make a coarse timing adjustment I 320 on the unsynchronized signal 302.

The coarsely synchronized signal 302' is passed forward for stage II processing. In stage II 500, initiated by a start stage II signal 409, fine timing synchronization 500 is performed. The output of stage II 500 is a fine index signal 508 which is used to make a fine timing adjustment II 330 on the coarsely synchronized signal 302'. Signal 509, at the completion of stage II 500, starts frequency synchronization 340 with offset correction. The time and frequency synchronized signal 309 can now be demodulated.

Signal Detection and Coarse Timing Synchronization

Figure 4:
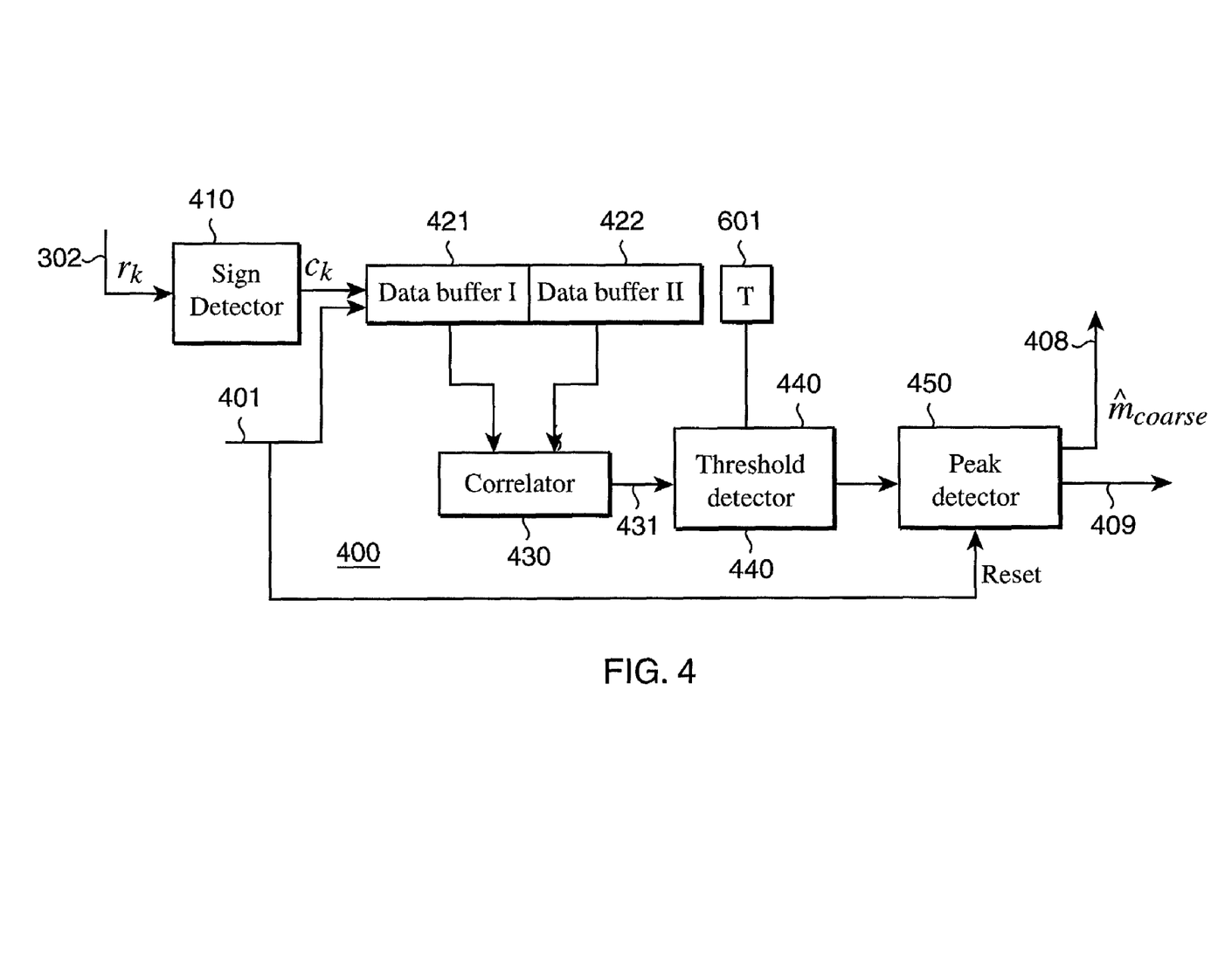
FIG. 4 is a block diagram of an OFDM signal detector and coarse timing synchronization according to the invention.

FIG. 4 shows the details of stage I 400 in greater detail. Complex values $r_k = i_k + q_k$ 302 represent the digitized samples of the received analog OFDM signal 301, where N, e.g., sixteen, is the number of complex samples in one short training OFDM symbol as described above. In FIG. 4, the complex-values samples received 302 from the ADC 310 are converted to two sign bits, e.g., either plus or minus, by the sign detector 410.

The sign detector 410 takes the sign of in-phase and quadrature components of the samples 302, and converts these samples to either plus or minus. The received samples $c_k$ 411 are also stored in data buffers 420. The data buffers 421–422 are initialized with zeros. The buffers are arranged as shift registers, with samples coming in from the left and shifted to the right from the first to the second buffer, and then discarded. Eventually, the first data buffer 421 stores the samples of first half (five) of the short training field 201, and the second data buffer 422 stores the samples of the second half.

Only sign bits of the in-phase and the quadrature components are used to reduce the computational complexity for the OFDM signal detection and coarse timing estimation. Thus, the sign detector 410 can be described as follows:

$$c_k = Q[r(k)], k=1, \ldots, N \quad (5)$$

$$Q[x] = \text{sign}(Re\{x\}) + j\text{sign}(Im\{x\}) \quad (6)$$

$$\text{sign}(x) \equiv \begin{cases} +1, x \geq 0, \\ -1, x < 0, \end{cases} \quad (7)$$

where Re is the real part of each sample, and Im is the imaginary part.

Because the signal $C_k$ is a complex bitstream, the sample $c_k$ can only take one of four different values in a set $$\{1+j, -1+j, -1-j, 1-j\}. \quad (8)$$

The signal $c_k$ can thus be represented by two sign bits, one sign bit for the real part (Re), and one sign bit for the imaginary part (Im).

A first correlator 430 determines a first correlation value 431, $$d(m) = \left(\frac{1}{N_{short}}\right) \sum_{i=0}^{N_{short\_half}-1} \text{Re}\{c_{m+i} c^*_{m+i+N_{short\_half}}\}, \quad (9)$$

where m is the first sample in the data buffer, $N_{short\_half}$ is the number of samples equivalent to one half of the entire short training frame 201, and $N_{short}$ is the number of samples in the entire short training frame 201. For example, if each short training symbol is sampled sixteen times, then the length of the entire short training frame, $N_{short}$ is 160 samples. The correlator 430 calculates the first correlated value 431 as a sum of vector products of the stored sign bits of the first and second data buffers.

The first correlation value, d(m) 431 normalized in a range [0,1], is checked against a predetermined threshold T 601, e.g. 0.4, in a threshold detector 440 to determine when the first correlation value d(m) exceeds the threshold value 601 by checking the condition:

$$d(m) > T.$$

When the correlation value, d(m) 431 exceeds the threshold value T 601, the peak detector 450 is invoked. The peak detector 450 locates a maximum peak correlated value within, for example, a window of thirty-two samples (two symbol widths in time), according to the equation:

$$\hat{m}_{coarse} = \underset{m}{\text{argmax}}\, d(m).$$

This yields a low complex estimate of the timing position, that is the coarse index 408. Thus, the OFDM signal detector 400 concurrently detects the symbols of the incoming training sequence 200, and produces the coarse index 408.

Up-Sampling and Fine Timing Synchronization

Figure 5:
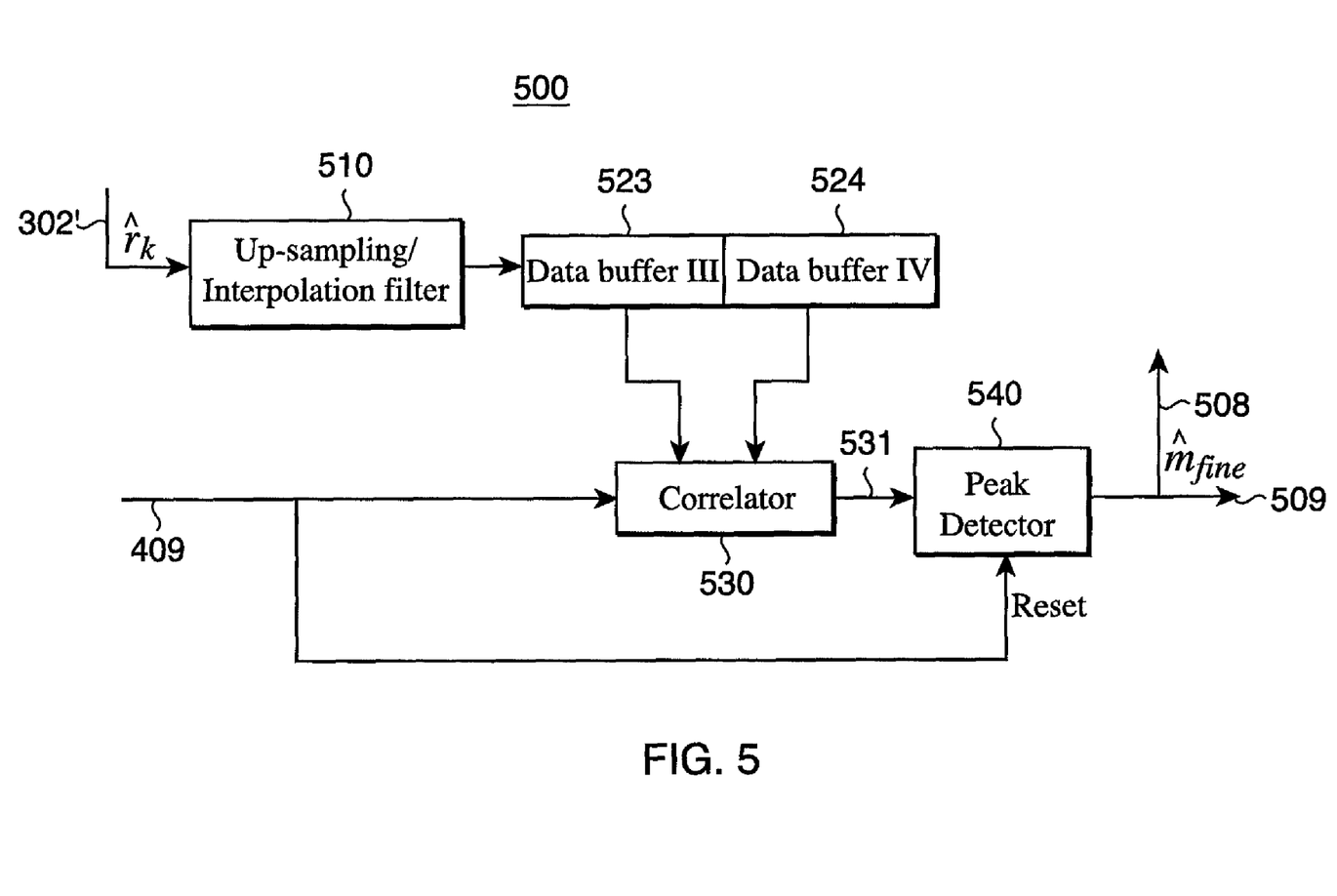
FIG. 5 is a block diagram of up-sampling and fine timing synchronization according to the invention.

As shown in FIG. 5, the fine timing synchronization in stage II 500 is performed using an up-sampler/interpolator 510, two data buffers 523–524, a second correlator 530, and a second peak detector 540. The up-sampling and digital interpolation filtering 510 provides additional high resolution samples for the data buffers 523–524, thus, the resolution of the correlation is increased by a factor of four. A finite impulse response (FIR) low pass filter can be used to provide interpolated samples at a rate four times higher than the original sampling rate.

The value m is a time index corresponding to the first interpolated sample in data buffer 523, and the value N is the number of interpolated samples in one short training symbol. A conjugate, $$\hat{r}_k^*,$$

of time adjusted samples of the first OFDM short training symbol is stored in the third data buffer 523. The interpolated samples from the last OFDM short training symbol, $$\hat{r}_{k+9N}^*,$$

are stored in the fourth data buffer 524.

To estimate the correct frame/symbol timing of the OFDM signal, the interpolated samples from first and second data buffers are used to calculate a second correlation output 531 using the vector cross product:

$$\Lambda(m) = \sum_{i=0}^{N-1} \hat{r}_{m+i} \hat{r}_{m+i+9N}^*. \tag{10}$$

Note, that only component of the first and last short training symbol are correlated in stage II to get the fine index 508. In case of a low signal-to-noise ratio, the size of the first and the last portion of short training symbols can be increased. For example, instead of just using the first and last short training symbols, the first two and last two short training symbols can be used for the fine correlation. A best estimate for symbol timing is achieved when the timing index m maximizes the correlated output $\Lambda(m)$. Finally, the second peak detector 540 determines the peak value, as described above, and generates the fine timing index 508, $\hat{m}_{fine}$, for the fine timing adjustment 330 of FIG. 3 using:

$$\hat{m}_{fine} = \underset{m}{\mathrm{argmax}}\, \Lambda(m),$$

at which point carrier frequency offset correction 340 can begin, followed by demodulation.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for synchronizing timing in a receiver to an orthogonal frequency division multiplex (OFDM) signal transmitted over a channel, the OFDM signal including a plurality of training symbols, comprising:
   coarse correlating, in an unsynchronized OFDM signal, a first half of the plurality of training symbols with a second half of the plurality of training symbols to determine a coarse index;
   coarse adjusting the unsynchronized OFDM signal with the coarse index;
   fine correlating, in the coarsely adjusted OFDM signal, a first of the plurality of training symbols with a last of the plurality of training symbols to determine a fine index; and
   fine adjusting the coarsely adjusted OFDM signal with the fine index to synchronize the timing of the receiver.

2. The method of claim 1 further comprising:
   converting each of the first and second half of the plurality of training symbols to a corresponding plurality of first samples;
   converting each first sample to sign bits;
   storing the samples of the first half in a first buffer, and storing the samples of the second half in a second buffer;
   calculating a first correlated value as a sum of vector products of the sign bits of the first and second buffers;
   detecting a peak first correlated value to determine the coarse index.

3. The method of claim 2 wherein the sign bits are in-phase and quadrature components of the samples.

4. The method of claim 3 wherein the sign bits of each sample take one of four different values in a set {1+j, −1+j, −1 −j, 1−j}.

5. The method of claim 2 where the first correlated value d(m) is $$d(m) = \left(\frac{1}{N_{short}}\right) \sum_{i=0}^{N_{short\_half}-1} \mathrm{Re}\{c_{m+i} c_{m+i+N_{short\_half}}^*\}, \tag{9}$$

where m is a first sample in the first data buffer, $N_{short\_half}$ is half the total number of samples stored in the first and second data buffers, and $N_{short}$ is the total number of samples stored in the first and second data buffers.

6. The method of claim 2 further comprising:
   normalizing the first correlated value to a range [0.1]; and
   detecting the peak first correlated value when the first correlated value exceeds a predetermined threshold.

7. The method of claim 1 further comprising:
   up-sampling the first and last training symbols to corresponding first and second interpolated samples;
   storing the first interpolated samples of the first training symbol in a third buffer, and storing the second interpolated samples of last training symbol in a fourth buffer;
   calculating a second correlated value as a sum of vector products of the third and fourth buffers; and
   detecting a peak second correlated value to determine the fine index.

8. The method of claim 7 wherein the up-sampling is performed with a finite impulse response low pass filter.

9. The method of claim 7 wherein the up-sampling is by a factor of four.

10. The method of claim 7 wherein the second correlated value is $$\Lambda(m) = \sum_{i=0}^{N-1} \hat{r}_{m+i} \hat{r}_{m+i+9N}^*,$$

where N is the number of training symbols, and m is the first training symbol.

* * * * *